United States Patent
Kume et al.

(10) Patent No.: US 11,441,676 B2
(45) Date of Patent: Sep. 13, 2022

(54) ROTARY ACTUATOR

(71) Applicant: DENSO CORPORATION, Kariya (JP)

(72) Inventors: Mikine Kume, Kariya (JP); Kiyoshi Kimura, Kariya (JP); Hiroyuki Kado, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/204,430

(22) Filed: Mar. 17, 2021

(65) Prior Publication Data

US 2021/0199194 A1    Jul. 1, 2021

Related U.S. Application Data

(63) Continuation of application No. PCT/JP2019/036855, filed on Sep. 19, 2019.

(30) Foreign Application Priority Data

Sep. 20, 2018  (JP) .............................. JP2018-175775

(51) Int. Cl.
*F16H 61/32*    (2006.01)
*F16H 1/32*    (2006.01)
*G01D 5/14*    (2006.01)

(52) U.S. Cl.
CPC ............... *F16H 61/32* (2013.01); *F16H 1/32* (2013.01); *F16H 2061/326* (2013.01); *G01D 5/14* (2013.01)

(58) Field of Classification Search
None
See application file for complete search history.

(56) References Cited

U.S. PATENT DOCUMENTS

| | | | | |
|---|---|---|---|---|
| 7,658,123 B2* | 2/2010 | Hori | ....................... | F16H 61/32 74/335 |
| 7,987,959 B2* | 8/2011 | Itazu | .................... | F16H 63/3458 74/411 |
| 9,726,281 B2* | 8/2017 | Kurita | ..................... | F16H 57/082 |
| 10,563,760 B2* | 2/2020 | Takahashi | ................. | F16H 1/32 |
| 2012/0255385 A1* | 10/2012 | Nakayama | ............ | F16H 19/001 74/437 |
| 2016/0131252 A1 | 5/2016 | Kurita et al. | | |
| 2017/0152943 A1 | 6/2017 | Kume et al. | | |
| 2019/0229588 A1 | 7/2019 | Takahashi et al. | | |

FOREIGN PATENT DOCUMENTS

| | | | | |
|---|---|---|---|---|
| CN | 205706836 | | 11/2016 | |
| JP | 2002327843 A | * | 11/2002 | ............. F16H 61/12 |
| JP | 2012-180909 | | 9/2012 | |
| JP | 2012180909 A | * | 9/2012 | |
| JP | 2016089967 A | * | 5/2016 | ......... F16H 57/0486 |
| WO | WO-2013087170 A1 | * | 6/2013 | ............... F16D 3/10 |

* cited by examiner

*Primary Examiner* — Dirk Wright
(74) *Attorney, Agent, or Firm* — Nixon & Vanderhye P.C.

(57) ABSTRACT

A rotary actuator used in a shift-by-wire system of a vehicle includes: a motor; an output shaft arranged parallel to a rotation shaft of the motor; and a deceleration mechanism that decelerates rotation of the motor and transmits it to the output shaft. The deceleration mechanism includes a drive gear provided over a rotation axis of the rotation shaft and a driven gear provided over a rotation axis of the output shaft to mesh with the drive gear. The driven gear is a separate member from the output shaft and is loosely fitted to the output shaft.

5 Claims, 10 Drawing Sheets

ROTARY ACTUATOR

CROSS REFERENCE TO RELATED APPLICATION

The present application is a continuation application of International Patent Application No. PCT/JP2019/036855 filed on Sep. 19, 2019, which designated the U.S. and claims the benefit of priority from Japanese Patent Application No. 2018-175775 filed on Sep. 20, 2018. The entire disclosures of all of the above applications are incorporated herein by reference.

TECHNICAL FIELD

The present disclosure relates to a rotary actuator.

BACKGROUND ART

Conventionally, a rotary actuator used as a driving unit for a shift-by-wire system of a vehicle is known. A two-shaft type actuator has an output shaft arranged in parallel with a rotation shaft of a motor. A reduction mechanism is arranged between the motor and the output shaft.

SUMMARY

According to the present disclosure, a rotary actuator used in a shift-by-wire system for a vehicle includes a motor, an output shaft arranged in parallel with a rotation shaft of the motor, and a reduction mechanism for decelerating the rotation of the motor and transmitting the rotation to the output shaft. The reduction mechanism includes a drive gear provided over an axis of the rotation shaft and a driven gear provided over an axis of the output shaft to mesh with the drive gear. The driven gear is a separate member from the output shaft and is loosely fitted to the output shaft.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENT

Figure 1:
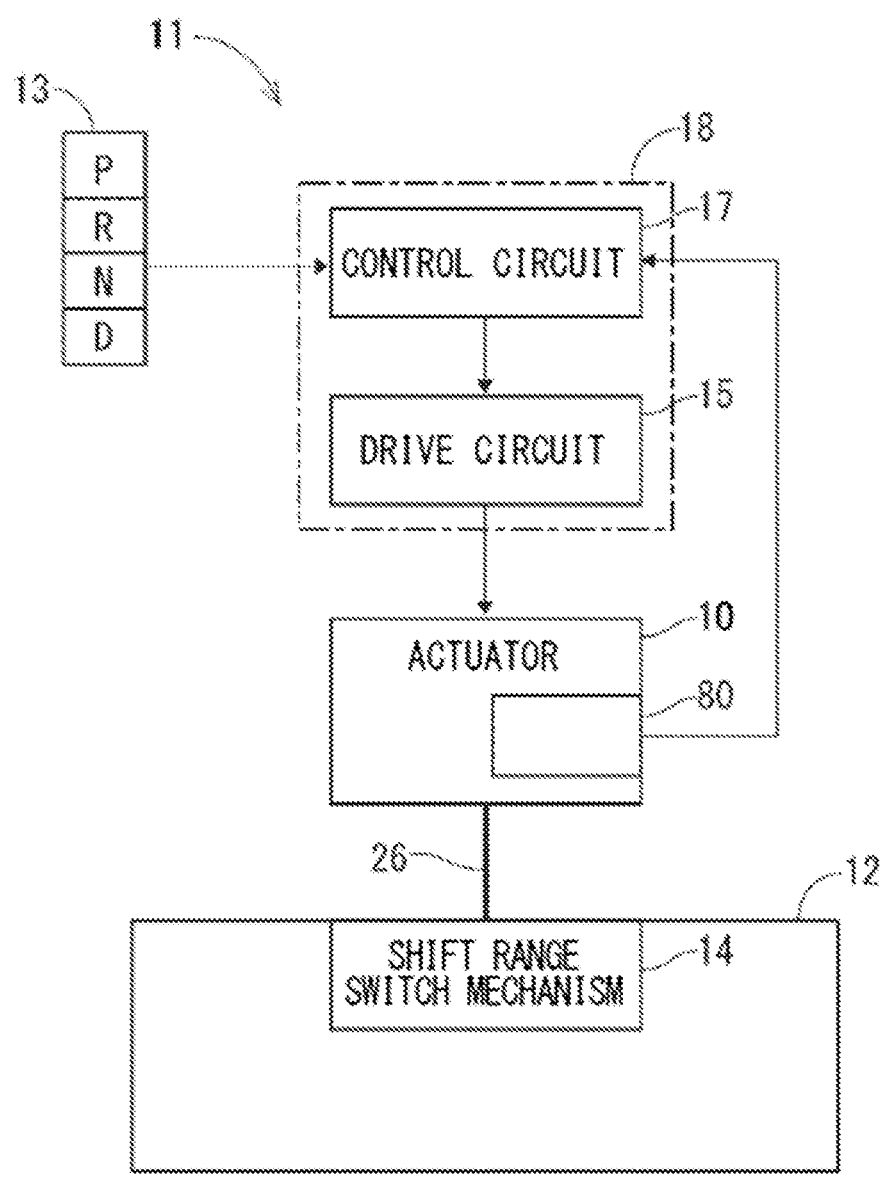
FIG. 1 is a schematic view showing a shift-by-wire system to which a rotary actuator according to an embodiment is applied.

To begin with, examples of relevant techniques will be described.

Conventionally, a rotary actuator used as a driving unit for a shift-by-wire system of a vehicle is known. A two-shaft type actuator has an output shaft arranged in parallel with a rotation shaft of a motor. A reduction mechanism is arranged between the motor and the output shaft. The reduction mechanism includes a planetary gear reduction unit including a sun gear and a ring gear, and a parallel shaft type reduction unit including a drive gear and a driven gear. The driven gear and the output shaft are constructed by one molded product.

When the shift range is switched, if the output shaft of the actuator is stopped and positioned while a locking portion of a detent spring is located in front of a valley position of a detent lever, the locking portion is moved by the spring force of the detent spring to the valley position. The movement range due to the torque of such a spring force (hereinafter, detent torque) becomes narrower as the driven torque of the actuator increases. Therefore, when the driven torque is large, high accuracy is required for the stop control of the output shaft position of the actuator. It is conceivable to increase the detent torque, but in that case, the required torque for the actuator becomes high, which causes an increase in the physique of the actuator, which is not preferable.

Ensuring play at the fitting portion between the output shaft and the manual shaft contributes to the reduction of the driven torque. However, the play may be reduced by the influence such as inclination or imperfect alignment, at the time of assembling the manual shaft, or deviation of the fitting portion.

The present disclosure provides a rotary actuator capable of lowering the accuracy for controlling the stop position of the output shaft.

According to the present disclosure, a rotary actuator used in a shift-by-wire system for a vehicle includes a motor, an output shaft arranged in parallel with a rotation shaft of the motor, and a reduction mechanism for decelerating the rotation of the motor and transmitting the rotation to the output shaft. The reduction mechanism includes a drive gear provided over an axis of the rotation shaft and a driven gear provided over an axis of the output shaft to mesh with the drive gear. The driven gear is a separate member from the output shaft and is loosely fitted to the output shaft.

The driven torque is reduced by setting a play (that is, intentionally providing a gap) between the driven gear and the output shaft inside the actuator, thereby widening the movement range. Thus, it is possible to lower the control accuracy of the stop position of the output shaft.

It is also possible to reduce the detent torque. Accordingly, the required torque of the actuator is reduced, and the load can be reduced on the actuator side and the detent side when switching the shift range.

When a protrusion of the sun gear and a through hole of the drive gear are provided for torque transmission, it is also possible to change the through hole from a round hole to an elongated hole to secure the play. However, the driven torque may be increased due to the influence such as the friction of the gear meshing portion between the drive gear and the driven gear or the friction of the bearing of the drive gear. In addition, the processing cost is increased due to the elongated hole. Further, when it is necessary to reduce the number of through holes in terms of space, the torque transmission efficiency may decrease.

In response to the above issues, according to the present disclosure, it is not necessary to provide the elongated hole as the through hole or reduce the number of through holes by providing a play between the driven gear and the output shaft.

Further, compared with the conventional molded product in which the driven gear and the output shaft are integrally formed, according to the present disclosure in which the driven gear and the output shaft are made into separate members, the driven gear and the output shaft can be made into a simple shape to reduce the processing cost.

In the present specification, "a member that rotates integrally with the output shaft" is a member that rotates together with the output shaft without rotating relative to the output shaft. For example, it refers to a manual shaft of a shift range switch mechanism.

Embodiment

Hereinafter, a rotary actuator (hereinafter, actuator) of an embodiment will be described with reference to the drawings. The actuator is used as a driving unit for a shift-by-wire system of a vehicle.
(Shift-by-Wire System)

The configuration of the shift-by-wire system will be described with reference to FIG. 1 and FIG. 2. As shown in FIG. 1, the shift-by-wire system 11 includes: a shift operation device 13 that commands a shift range of a transmission 12; an actuator 10 that operates a shift range switch mechanism 14 of the transmission 12; a drive circuit 15 that energizes the actuator 10; and a control circuit 17. The control circuit 17 drives the actuator 10 by controlling the drive circuit 15 in response to a command signal of a shift range. The drive circuit 15 and the control circuit 17 form an electronic control unit (hereinafter, ECU) 18.

Figure 2:
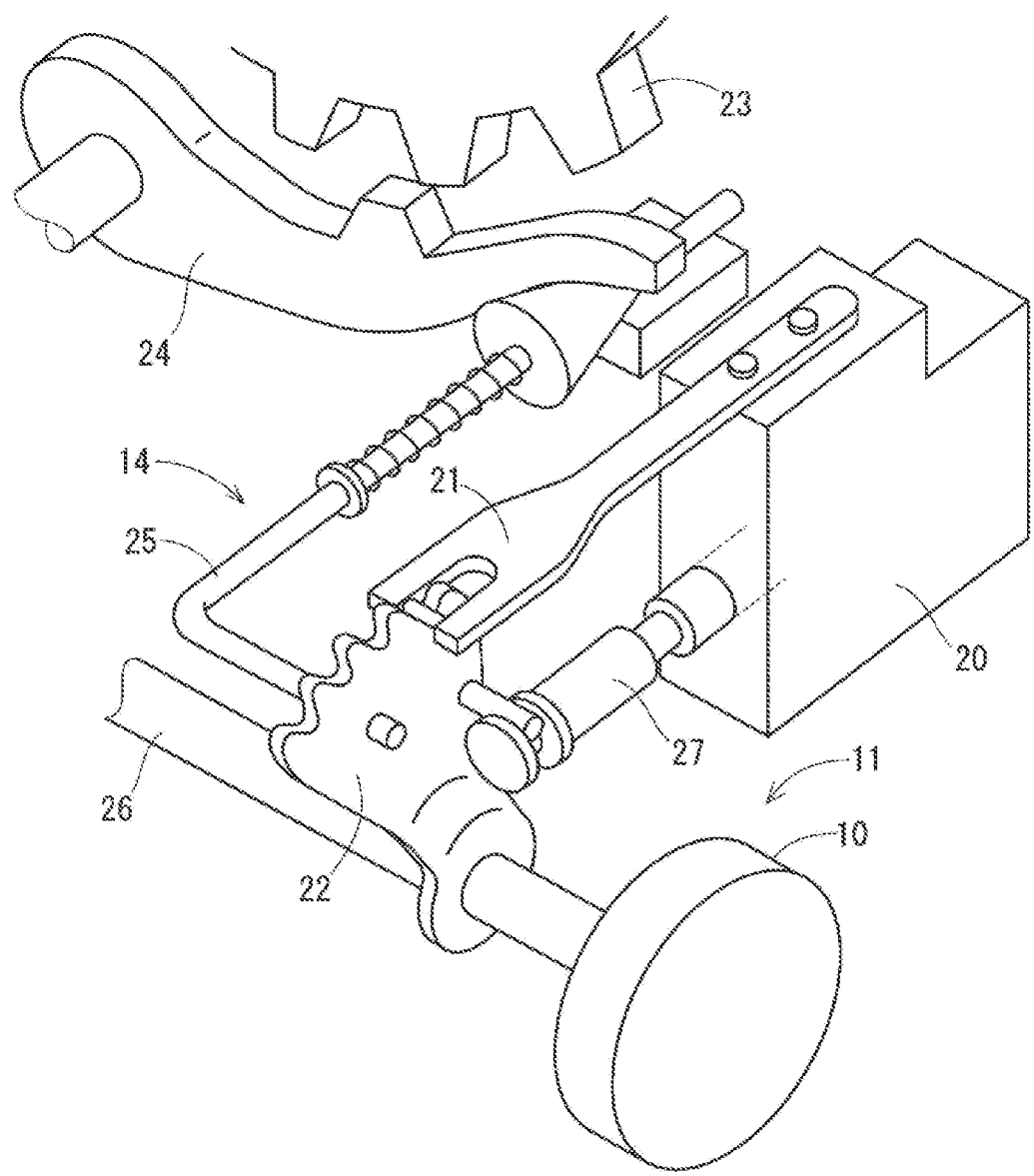
FIG. 2 is a diagram illustrating a shift range switch mechanism of FIG. 1.

As shown in FIG. 2, the shift range switch mechanism 14 includes a range switching valve 20, a detent spring 21 and a detent lever 22 configured to keep a shift range, a park rod 25, and a manual shaft 26. The range switching valve 20 controls a supply of hydraulic pressure to a hydraulic operating mechanism in the transmission 12. The park rod 25 locks the rotation of the output shaft, when the shift range is switched to a parking range, by fitting a park pole 24 into a park gear 23 of the output shaft of the transmission 12. The manual shaft 26 rotates together with the detent lever 22.

The shift range switch mechanism 14 rotates the detent lever 22 together with the manual shaft 26 to move a valve body 27 of the range switching valve 20 connected to the detent lever 22 and the park rod 25 to a position corresponding to a target shift range. In the shift-by-wire system 11, the actuator 10 is connected to the manual shaft 26 in order to perform the shift range change electrically.
(Actuator)

Figure 3:
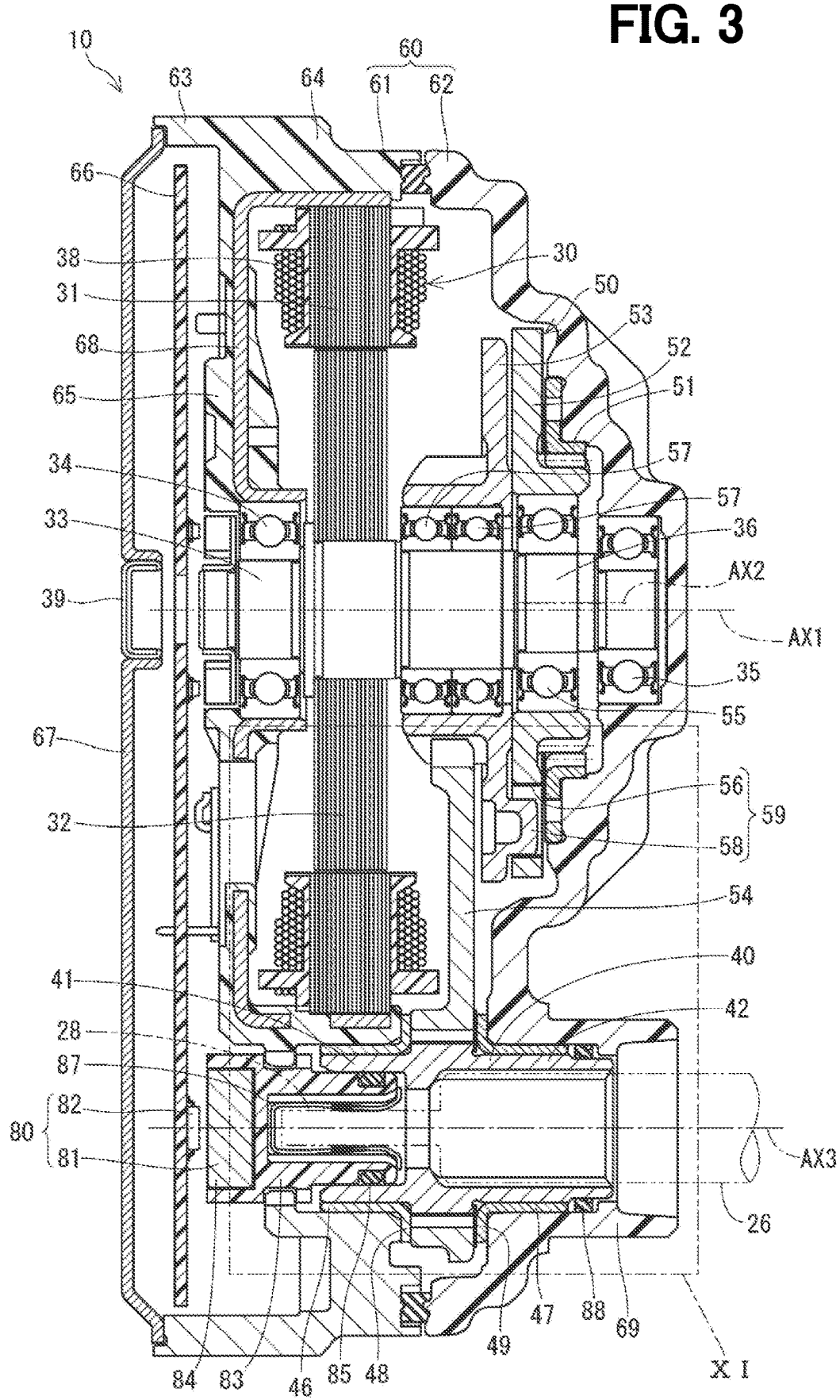
FIG. 3 is a cross-sectional view of the rotary actuator of FIG. 1.

Next, the configuration of the actuator 10 will be described. As shown in FIG. 3, the actuator 10 includes a motor 30 as a power generation source, an output shaft 40, a deceleration mechanism 50 and a case 60. The output shaft 40 is arranged in parallel with the motor 30. The deceleration mechanism 50 decelerates the rotation of the motor 30, and transmits the rotation of the motor 30 to the output shaft 40. The case 60 houses the motor 30, the output shaft 40, and the deceleration mechanism 50.

The case 60 includes a cylindrical upper case 61 and a cup-shaped lower case 62. The upper case 61 has a partition 65 formed between one end 63 and the other end 64 of the upper case 61. A board 66 is disposed inside the one end 63, and a drive circuit and a control circuit (see FIG. 1) are mounted on the board 66. The board 66 is fixed to the partition 65 by, for example, heat swaging. The board 66 is covered by a plate cover 67, thereby ensuring shielding (water proof) for the board 66. The lower case 62 is attached to the other end 64. The lower case 62 has a cylindrical protrusion 69 that protrudes away from the upper case 61. The manual shaft 26 is inserted into the cylindrical protrusion 69.

The motor 30 includes: a stator 31 press-fitted and fixed to a plate case 68 of the other end 64, a rotor 32 provided inside the stator 31, and a rotation shaft 33 that rotates about a rotation axis AX1 together with the rotor 32. The rotation shaft 33 is rotatably supported by a bearing 34 provided in the plate case 68 and a bearing 35 provided in the lower case 62. Further, the rotation shaft 33 has an eccentric portion 36 eccentric to the rotation axis AX1 at a position adjacent to the lower case 62 relative to the rotor 32. The motor 30 is able to rotate bidirectionally by controlling a current supplied to a three-phase winding 38 of the stator 31 by the control circuit (see FIG. 1) and is also able to stop at a desired rotational position. The plate cover 67 has a through hole, and a plug 39 is attached to the through hole. When a failure occurs, the rotation shaft 33 can be rotated manually after detaching the plug 39.

The deceleration mechanism 50 includes a ring gear 51, a sun gear 52, a drive gear 53, and a driven gear 54. The ring gear 51 is provided over the rotation axis AX1 and is press-fitted and fixed to the lower case 62. The sun gear 52 is rotatably supported about the eccentric axis AX by a bearing 55 fitted with the eccentric portion 36, and meshes with the ring gear 51 to inscribe. When the rotation shaft 33 rotates, the sun gear 52 performs planetary motion about the eccentric axis AX2 while the sun gear 52 revolves around the rotation axis AX1. At this time, the rotation speed of the sun gear 52 is reduced with respect to the rotation speed of the rotation shaft 33. The sun gear 52 has a through hole 56 that penetrates in the axial direction for transmitting the rotation.

The drive gear 53 is provided over the rotation axis AX1 between the rotor 32 and the sun gear 52, and is supported rotatably around the rotation axis AX1 by a bearing 57 fitted to the rotation shaft 33. Further, the drive gear 53 has a protrusion 58 inserted into the through hole 56 for rotation transmission. The rotation of the sun gear 52 is transmitted to the drive gear 53 by the engagement between the through hole 56 and the protrusion 58. The through hole 56 and the protrusion 58 form a transmission mechanism 59. The driven gear 54 is provided over the rotation axis AX3 which is parallel to the rotation axis AX1 and coaxial with the cylindrical protrusion 69. The driven gear 54 meshes with the drive gear 53 to circumscribe the drive gear 53. When the drive gear 53 rotates about the rotation axis AX1, the driven gear 54 rotates about the rotation axis AX3. At this time, the rotation speed of the driven gear 54 is reduced relative to the rotation speed of the drive gear 53.

The output shaft 40 has a cylindrical shape, and is provided coaxially with the rotation axis AX3. The partition 65 has a through support hole 89 coaxial with the rotation axis AX3. The output shaft 40 is rotatably supported about the rotation axis AX3 by a first flanged bush 46 fitted into the through support hole 89 and a second flanged bush 47 fitted inside the cylindrical protrusion 69. The manual shaft 26 is inserted into the output shaft 40 and is coupled to the output shaft 40 through, for example, spline fitting so as to transmit rotation.
(Driven Gear, Output Shaft)

Figure 4:
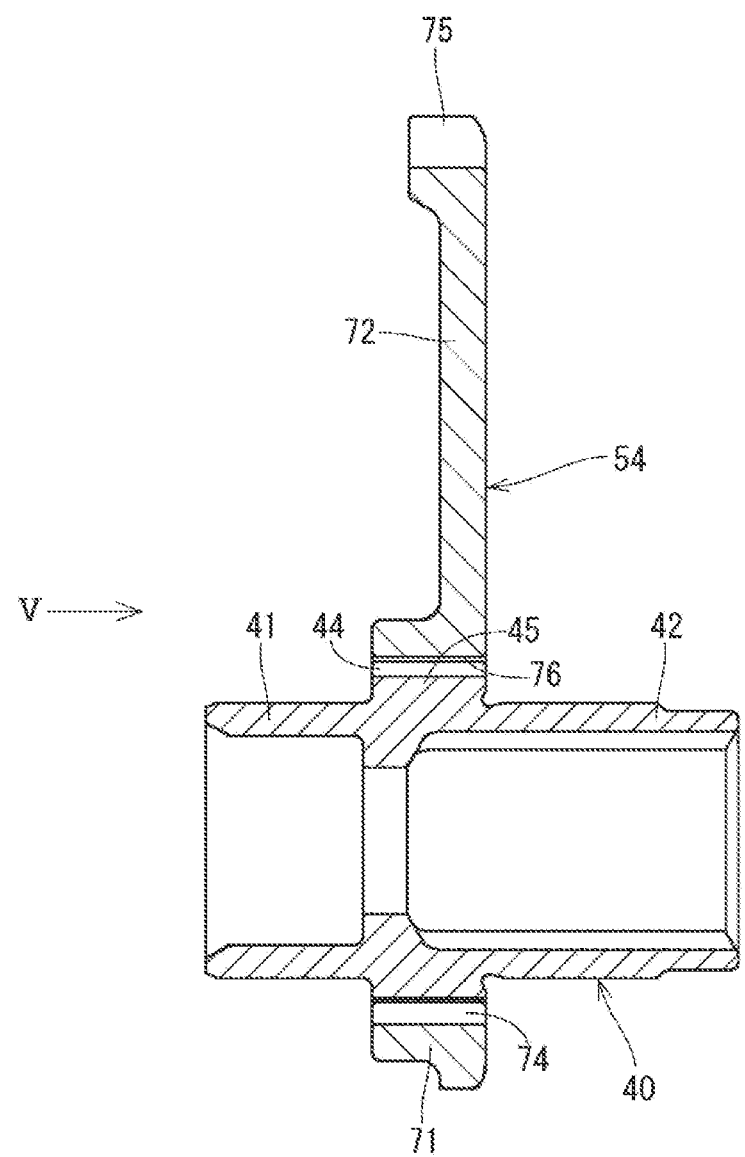
FIG. 4 is an enlarged cross-sectional view of a driven gear and an output shaft of FIG. 3.
Figure 5:
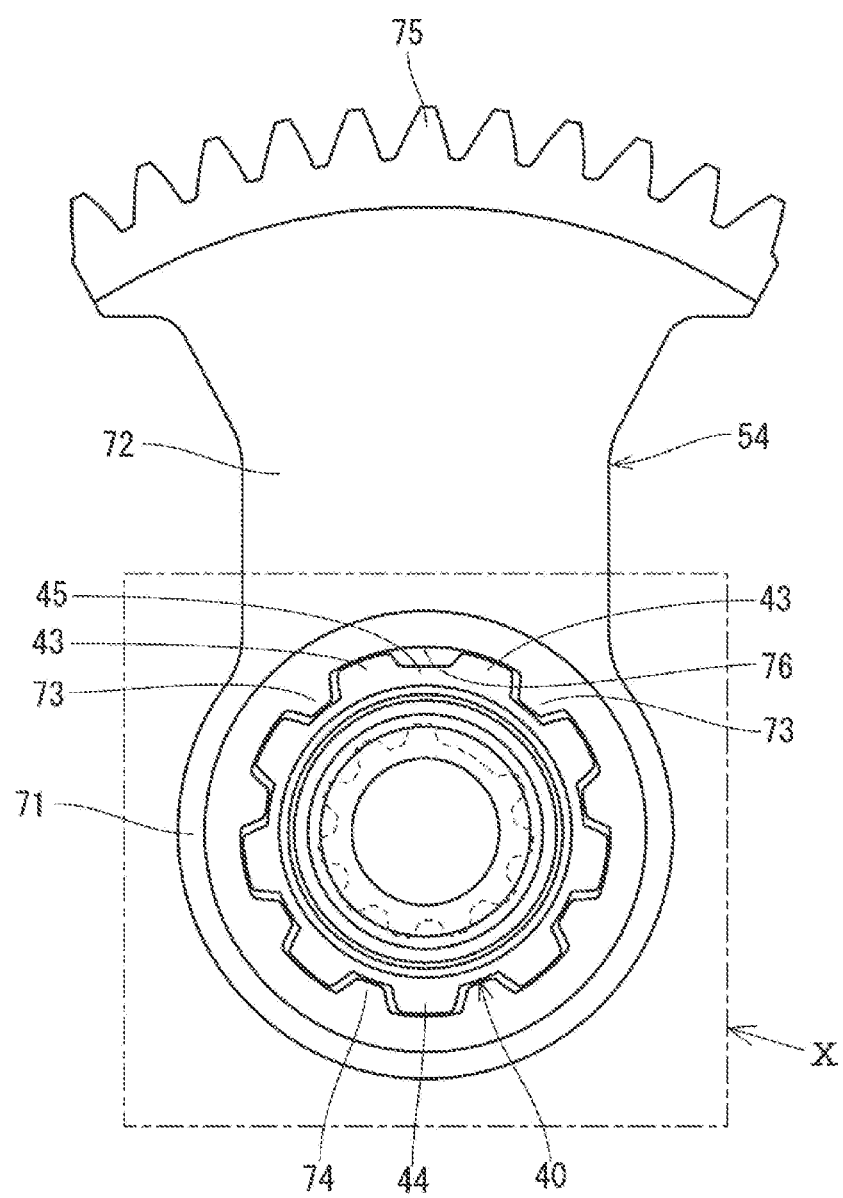
FIG. 5 is a view illustrating the driven gear and the output shaft of FIG. 4 as viewed from an arrow direction V.
Figure 6:
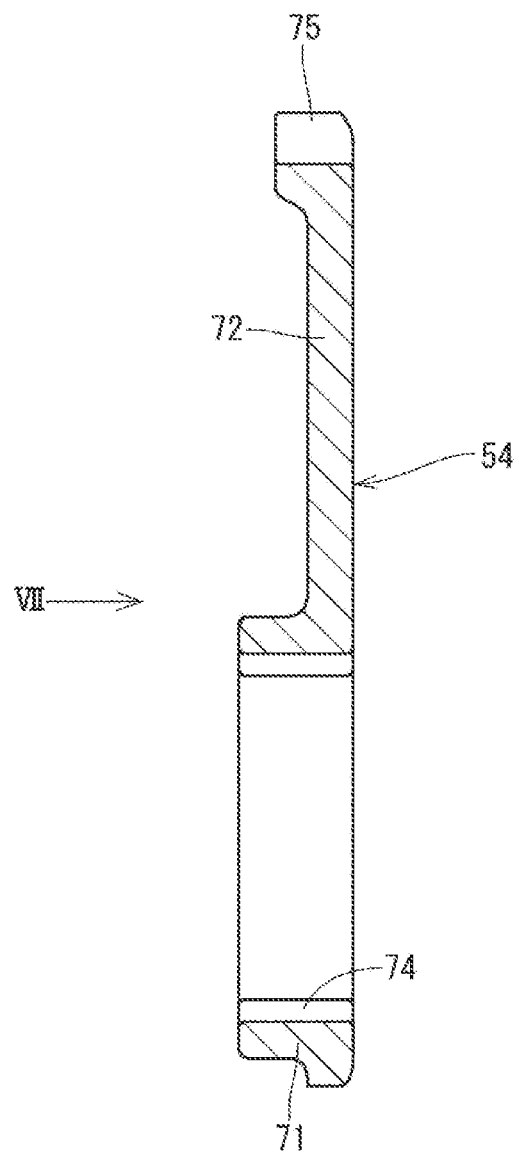
FIG. 6 is a cross-sectional view showing the driven gear of FIG. 4.
Figure 7:
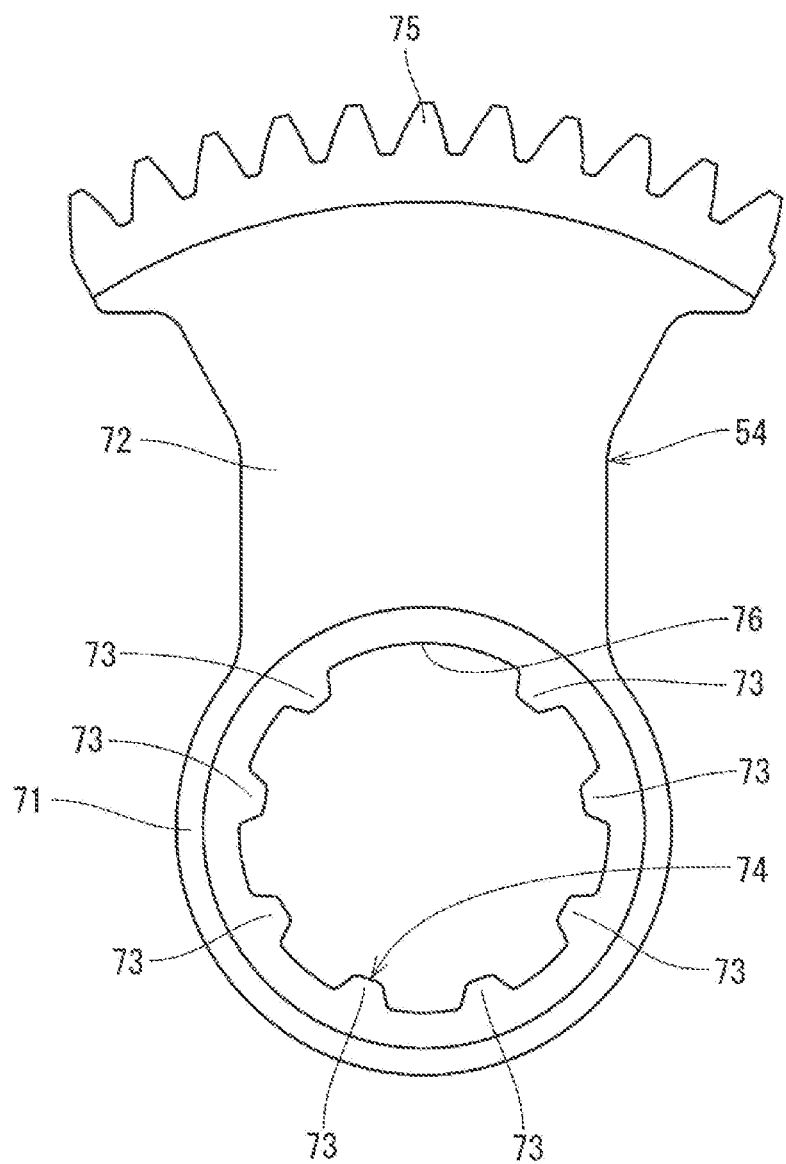
FIG. 7 is a view illustrating the driven gear of FIG. 6 as viewed from an arrow direction VII.
Figure 8:
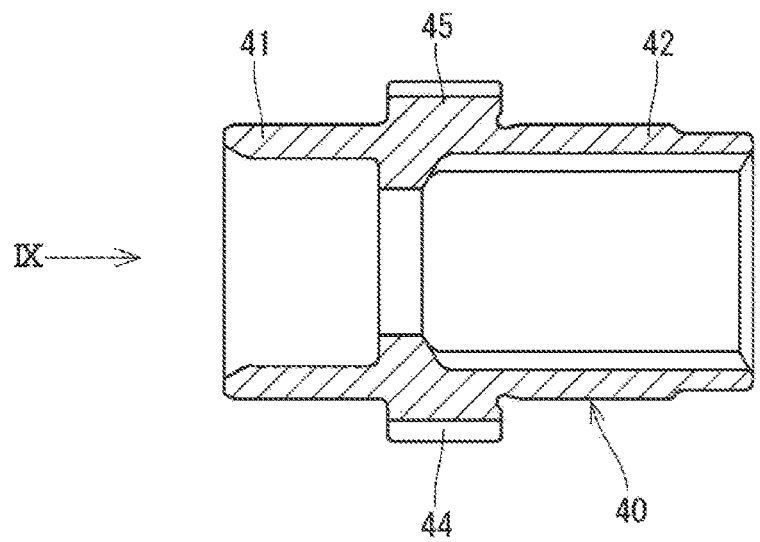
FIG. 8 is a cross-sectional view showing the output shaft of FIG. 4.
Figure 9:
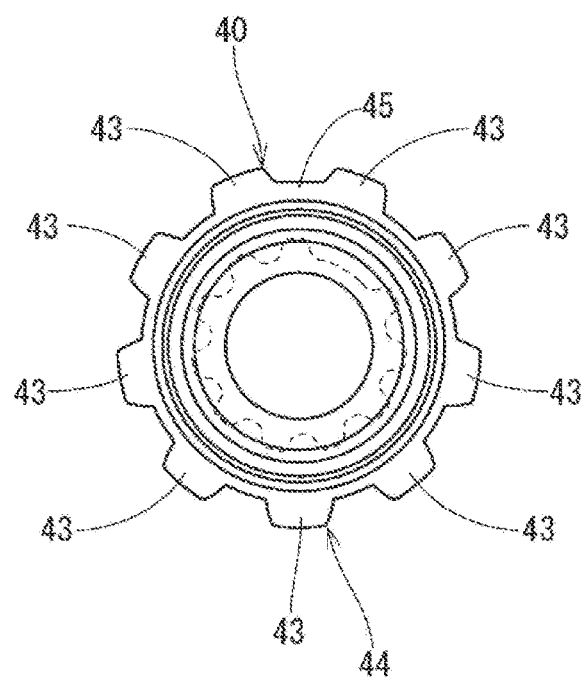
FIG. 9 is a view illustrating the output shaft of FIG. 6 as viewed from an arrow direction IX.

Next, the configuration of the driven gear 54, the output shaft 40, and the peripheral portions thereof will be described. As shown in FIGS. 3 to 5, the driven gear 54 is a separate member from the output shaft 40 and is loosely fitted to the output shaft 40.

As shown in FIGS. 4 to 7, the driven gear 54 has an annular portion 71 fitted to the output shaft 40 and a gear plate portion 72 protruding radially outward from the annular portion 71. The annular portion 71 includes an internal tooth portion 74 having plural internal teeth 73 arranged in the circumferential direction. The gear plate portion 72 has a plate shape, and only the meshing portion 75 meshing with the drive gear 53 is thicker than the other portion to ensure the strength of the gear. The meshing portion 75 and the internal tooth portion 74, which is a "play fitting portion", are arranged so that the positions overlap each other in the axial direction.

As shown in FIGS. 4, 5, 8 and 9, the output shaft 40 includes an external tooth portion 44 having plural external teeth 43 arranged in the circumferential direction, at a location between the one end 41 and the other end 42. The circumferential width of the external teeth 43 is smaller than the circumferential width of the gap between the internal teeth 73 adjacent to each other. The external tooth portion 44 engages with the internal tooth portion 74 so as to be relatively rotatable by the amount of play (that is, a gap intentionally provided). The rotation of the driven gear 54 is transmitted to the output shaft 40 via the internal tooth portion 74 and the external tooth portion 44.

Figure 10:
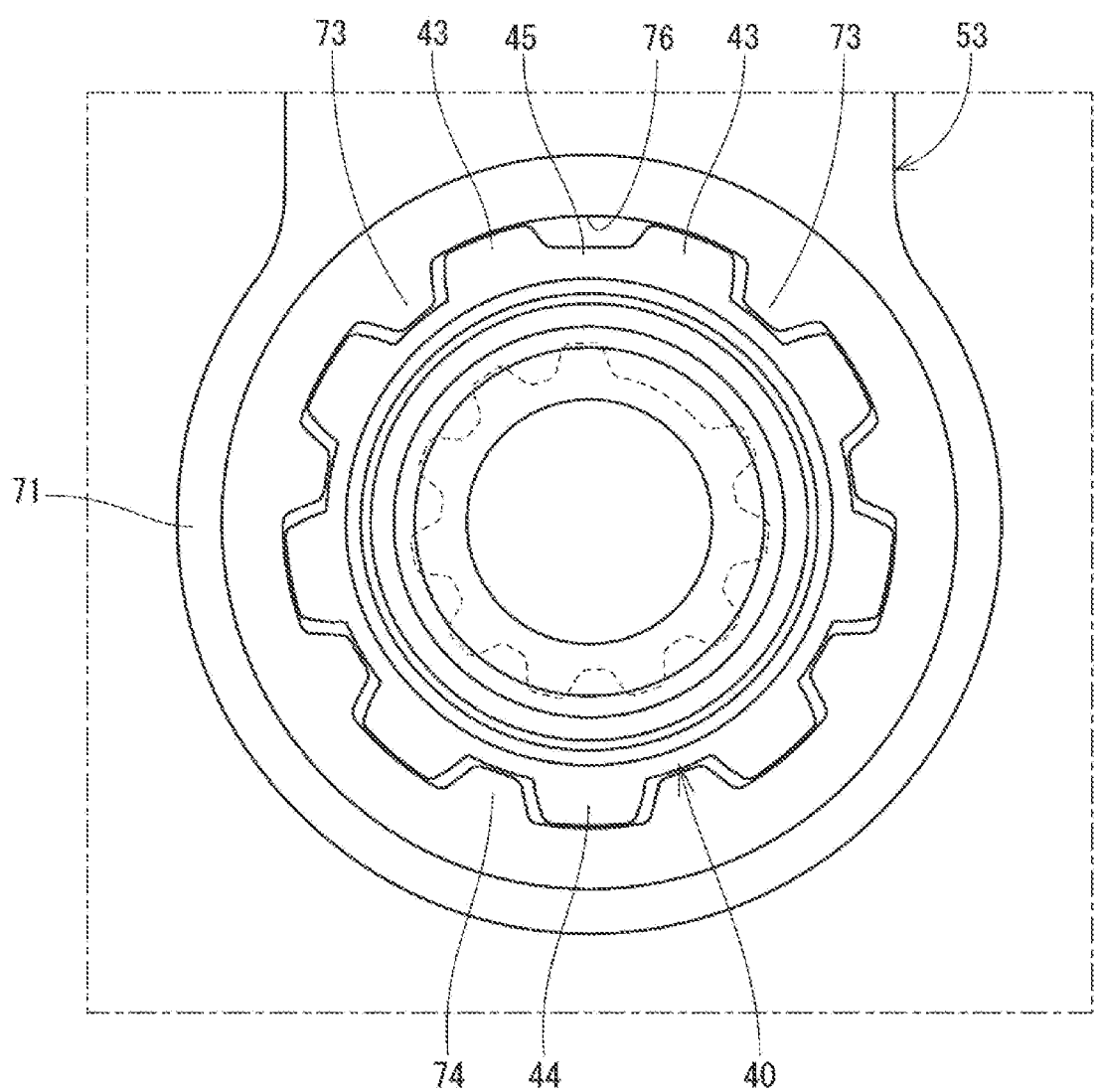
FIG. 10 is an enlarged view of an area X of FIG. 5.

As shown in FIG. 10, the internal tooth portion 74 has a tooth missing portion 76 at one position in the circumferential direction. That is, there is no internal tooth 73 at only one place while the plural internal teeth 73 are arranged at equal intervals in the circumferential direction. The external tooth portion 44 has a connecting tooth 45 at a location corresponding to the tooth missing portion 76. The connecting tooth 45 connects the external teeth 43 adjacent to each other through the location. In the present embodiment, the connecting tooth 45 connects the roots of the external teeth 43 to each other. The driven gear 54 can be fitted to the output shaft 40 only within a predetermined angle range including the amount of play.

Figure 11:
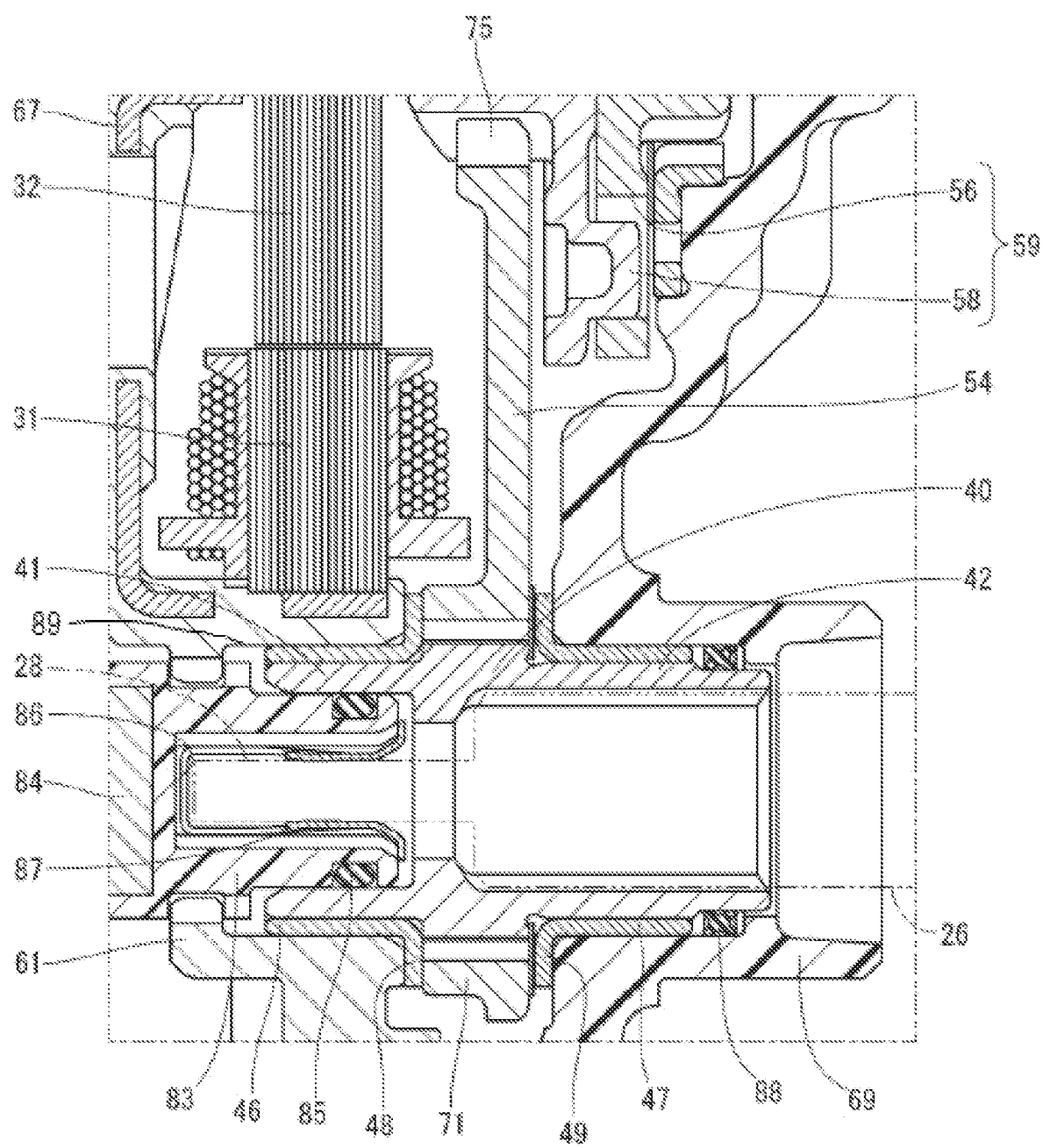
FIG. 11 is an enlarged view of an area XI of FIG. 3.

As shown in FIG. 11, one end 41 of the output shaft 40 is rotatably supported by the first flanged bush 46. The other end 42 of the output shaft 40 is rotatably supported by the second flanged bush 47. The driven gear 54 is supported in the axial direction by being clamped between a first flange portion 48 of the first flanged bush 46 and a second flange portion 49 of the second flanged bush 47. In another embodiment, the driven gear 54 may be supported in the axial direction by being clamped between a pair of supporting portions such as the case 60 and another plate.

The actuator 10 further includes a rotation position detection unit 80 having a magnetic circuit unit 81 and a magnetic sensor 82. The magnetic circuit unit 81 is attached to the output shaft 40. Specifically, the magnetic circuit unit 81 is formed by integrally molding the holder 83 and the magnet 84. The position of the holder 83 in the thrust direction is regulated by the upper case 61, and the position of the holder 83 in the radial direction is regulated by the output shaft 40. The rotation position detection unit 80 detects the rotation position of the output shaft 40 and the manual shaft 26 that rotates integrally with the output shaft 40, and outputs the rotation position to the ECU 18. In another embodiment, the magnetic circuit unit may be provided on an output shaft or a member (for example, a manual shaft) that rotates integrally with the output shaft. For example, the magnetic circuit unit may be attached to the manual shaft. Further, the holder of the magnetic circuit unit may be composed of the same parts as the output shaft or the manual shaft, and the magnet of the magnetic circuit unit may be integrally fixed to the holder (for example, adhesion, integral molding, etc.).

The holder 83 is inserted into the one end 41. An O-ring 85 is provided between the holder 83 and the one end 41. An end of the holder 83 facing the output shaft 40 has a bottomed hole 86. A spring 87 is fitted in the bottomed hole 86. The spring 87 holds a width across flat portion 28 formed at the end of the manual shaft 26 by a spring force, and functions as a backlash eliminating mechanism relative to the manual shaft 26.

An X-ring 88 is provided between the other end 42 of the output shaft 40 and the cylindrical protrusion 69. Conventionally, a seal member is provided between the actuator and the case of the transmission for sealing. However, the sealing property can be guaranteed by the actuator 10 alone by providing the X-ring 88 at the above-described position.

(Advantages)

As described above, in the first embodiment, the actuator 10 includes the motor 30, the output shaft 40 disposed in parallel with the rotation shaft 33 of the motor 30, and the deceleration mechanism 50 that reduces a rotational speed of the motor 30 and transmits rotation of the motor 30 at a reduced rotational speed to the output shaft 40. The deceleration mechanism 50 includes the drive gear 53 provided on the rotation axis AX1 of the rotation shaft 33 and the driven gear 54 provided on the rotation axis AX3 of the output shaft 40 to mesh with the drive gear 53. The driven gear 54 is a separate member from the output shaft 40 and is loosely fitted to the output shaft 40.

In this way, it is possible to reduce the driven torque by setting a play between the driven gear 54 and the output shaft 40 inside the actuator 10. Thus, the accuracy of controlling the stop position of the output shaft can be lowered by widening the movement range.

Further, the detent torque can be reduced. Therefore, the required torque of the actuator 10 can be reduced, and the load can be reduced on the actuator 10 and the detent lever 22 at the time of switching the shift range.

When the protrusion of the sun gear and the through hole of the drive gear are provided for torque transmission, it is also possible to change the through hole from a round hole to an elongated hole to secure the play. However, the driven torque may be increased due to the influence such as friction of the gear meshing portion between the drive gear and the driven gear and friction of the bearing of the drive gear. In addition, the processing cost increases by making the elongated hole. Further, when it is necessary to reduce the number of through holes in terms of space, the torque transmission efficiency may decrease.

In response to the above issues, according to the present embodiment, it is not necessary to make the elongated hole or reduce the number of through holes by providing a play between the driven gear 54 and the output shaft 40.

According to the present embodiment, the driven gear 54 and the output shaft 40 are produced separate from each other. Therefore, it is possible to reduce the processing cost, as compared with the conventional product integrally molding the driven gear and the output shaft, since the driven gear 54 and the output shaft 40 have a simple shape.

Further, in the present embodiment, the actuator 10 further includes the rotation position detection unit 80 having the magnetic circuit unit 81 and the magnetic sensor 82. The magnetic circuit unit 81 is attached to the output shaft 40. As a result, the position of the manual shaft 26, to which the torque is output, can be directly detected.

Further, in the present embodiment, the driven gear 54 includes the internal tooth portion 74 having the internal teeth 73 arranged in the circumferential direction. The output shaft 40 includes the external tooth portion 44 having the external teeth 43 arranged in the circumferential direction and engaging with the internal tooth portion 74 so as to be relatively rotatable by the amount of play. The internal tooth portion 74 has the tooth missing portion 76 at one position in the circumferential direction. The external tooth portion 44 has the connecting tooth 45 at a portion corresponding to the tooth missing portion 76 to connect the external teeth 43 adjacent to each other. As a result, the driven gear 54 and the output shaft 40 can be assembled only at a specific relative rotation position. Therefore, it is possible to restrict erroneous assembly regarding the rotation position.

Further, in the present embodiment, the meshing portion 75 of the driven gear 54 meshing with the drive gear 53 and the internal tooth portion 74 are arranged so that the axial positions overlap each other. As a result, the driven gear 54 is suppressed from falling.

Further, in the present embodiment, the actuator 10 further includes the first flanged bush 46 that supports the one end 41 of the output shaft 40, and the second flanged bush 47 that supports the other end 42 of the output shaft 40. The driven gear 54 is supported in the axial direction by being clamped between the first flange portion 48 of the first flanged bush 46 and the second flange portion 49 of the second flanged bush 47. As a result, the driven gear 54 is regulated in the axial direction, and the falling is suppressed.

Further, in the present embodiment, the motor 30 is configured to generate cogging torque although the magnet of the stator or the rotor is not shown in FIG. 2 and the like. When the cogging torque is generated, the driven torque of the actuator 10 becomes larger. Therefore, the high accuracy is required for the stop control of the output shaft position more prominently, but the issue is effectively solved in the present embodiment.

Other Embodiment

In another embodiment, the ring gear may be a product molded integrally with the lower case. Further, in another embodiment, the loose fitting between the driven gear and the output shaft may be achieved by using, for example, positioning convex portion and concave portion (such as key groove).

The present disclosure has been described based on the embodiments. However, the present disclosure is not limited to the embodiments and the structures. The present disclosure also includes various modification examples and modifications within the scope of equivalents. Furthermore, various combination and formation, and other combination and formation including one, more than one or less than one element may be made in the present disclosure.

What is claimed is:

1. A rotary actuator for a shift-by-wire system of a vehicle, the rotary actuator comprising:
   a motor;
   an output shaft arranged parallel to a rotation shaft of the motor; and
   a deceleration mechanism that reduces a rotational speed of the motor and transmits rotation of the motor at a reduced rotational speed to the output shaft, wherein
   the deceleration mechanism includes a drive gear provided over an axis of the rotation shaft and a driven gear provided over an axis of the output shaft to mesh with the drive gear,
   the driven gear is a separate member from the output shaft,
   the driven gear has an annular portion fitted to the output shaft and a gear plate portion protruding radially outward from the annular portion,
   the output shaft has an external tooth portion, at a location between one end and the other end of the output shaft,
   the annular portion includes an internal tooth portion to engage with the external tooth portion,
   the driven gear is rotatable relative to the output shaft by an amount of play between the internal tooth portion and the external tooth portion in a rotational direction,
   the gear plate portion has a meshing portion meshing with the drive gear,
   positions of the meshing portion and the internal tooth portion of the annular portion fitted with the output shaft overlap each other in an axial direction,
   the one end of the output shaft is rotatably supported by a first flanged bush,
   the other end of the output shaft is rotatably supported by a second flanged bush, and
   the driven gear is supported by being interposed between a first flange portion of the first flanged bush and a second flange portion of the second flanged bush in an axial direction.

2. The rotary actuator according to claim 1, further comprising: a rotation position detection unit having a magnetic circuit unit and a magnetic sensor, wherein the magnetic circuit unit is provided on the output shaft or a member that rotates integrally with the output shaft.

3. The rotary actuator according to claim 1, wherein
   the an internal tooth portion a plurality of internal teeth arranged in a circumferential direction,
   the an external tooth portion has a plurality of external teeth arranged in a circumferential direction,
   the internal tooth portion has a tooth missing portion at one position in the circumferential direction, and
   the external tooth portion has a connecting tooth at a portion corresponding to the tooth missing portion to connect the external teeth adjacent to each other.

4. The rotary actuator according to claim 1, further comprising:
   a case that houses the motor, the output shaft and the deceleration mechanism, wherein the case has an upper case and a lower case, wherein:
   the upper case includes a partition having a through support hole,
   the lower case has a cylindrical protrusion that protrudes away from the upper case,
   the one end of the output shaft is rotatably supported by the first flanged bush fitted into the through support hole, and
   the other end of the output shaft is rotatably supported by the second flanged bush fitted inside the cylindrical protrusion.

5. The rotary actuator according to claim 1, wherein
   the driven gear is supported in the axial direction by being clamped between the first flange portion of the first flanged bush and the second flange portion of the second flanged bush.

* * * * *